June 6, 1967 R. C. RAYTON ET AL 3,323,716

HIGH-SPEED TAPE PERFORATOR

Filed May 14, 1965 10 Sheets-Sheet 1

INVENTORS
RONALD C. RAYTON
KEITH L. FENDER
MARION R. DILLING
BY
Mellin, Moore & Weissenberger
ATTORNEYS INVENTORS
RONALD C. RAYTON
KEITH L. FENDER
MARION R. DILLING
BY
Mellin, Moore & Weissenberger
ATTORNEYS

HIGH-SPEED TAPE PERFORATOR

Filed May 14, 1965 10 Sheets-Sheet 3

INVENTORS
RONALD C. RAYTON
KEITH L. FENDER
MARION R. DILLING
BY
Mellin, Moore + Weissenberger
ATTORNEYS June 6, 1967 R. C. RAYTON ET AL 3,323,716

HIGH-SPEED TAPE PERFORATOR

Filed May 14, 1965 10 Sheets-Sheet 4

INVENTORS
RONALD C. RAYTON
KEITH L. FENDER
MARION R. DILLING

BY *Meelin, Moore + Weissenberger*
ATTORNEYS

June 6, 1967 R. C. RAYTON ET AL 3,323,716

HIGH-SPEED TAPE PERFORATOR

Filed May 14, 1965 10 Sheets-Sheet 5

INVENTORS
RONALD C. RAYTON
KEITH L. FENDER
MARION R. DILLING
BY
Mellin, Moore & Weissenberger
ATTORNEYS INVENTORS
RONALD C. RAYTON
KEITH L. FENDER
MARION R. DILLING
BY
Mellin, Moore & Weissenberger
ATTORNEYS INVENTORS
RONALD C. RAYTON
KEITH L. FENDER
MARION R. DILLING
BY Mellin, Moore + Weissenberger
ATTORNEYS

HIGH-SPEED TAPE PERFORATOR

INVENTORS
RONALD C. RAYTON
KEITH L. FENDER
MARION R. DILLING

BY Mellin, Moore & Weissenberger

ATTORNEYS

INVENTORS
RONALD C. RAYTON
KEITH L. FENDER
MARION R. DILLING
BY
Mellin, Moore & Weissenberger
ATTORNEYS June 6, 1967 R. C. RAYTON ET AL 3,323,716

HIGH-SPEED TAPE PERFORATOR

Filed May 14, 1965 10 Sheets-Sheet 10

INVENTORS
RONALD C. RAYTON
KEITH L. FENDER
MARION R. DILLING
BY
ATTORNEYS 3,323,716

HIGH-SPEED TAPE PERFORATOR

Ronald C. Rayton, Keith L. Fender, and Marion R. Dilling, Seattle, Wash., assignors to Tally Corporation, Seattle, Wash., a corporation of Washington Filed May 14, 1965, Ser. No. 455,925
21 Claims. (Cl. 234—119)

This invention relates to a mechanism for forming data perforations in tape or cards. More particularly, it relates to a perforating mechanism capable of high-speed (up to 150 characters per second) asynchronous perforation, automatic error detection, and remote backspacing.

The tape perforator described herein is particularly useful for data-recording by means of binary notation. With the increasing use of computers, it has become desirable to provide means for quickly and accurately recording data by perforating tape or cards.

The present invention is an improvement over the tape perforator disclosed in United States Patent No. 3,064,882 entitled, "Tape Perforator," filed Nov. 9, 1960, and issued Nov. 20, 1962. It also constitutes an improvement over the invention disclosed in United States Patent 2,948,116 entitled, "Incremental Bi-directional Drive Mechanism," filed May 18, 1959, and issued Aug. 9, 1960. The tape perforator and drive mechanism disclosed in the above two patents is the most pertinent prior art known. Although the inventions disclosed therein provide highly satisfactory apparatus for perforating tape, the present invention is an improvement thereover because it is capable of high-speed perforation and automatic error-detection. The perforators of the prior art are capable of punching, roughly, 50 characters per second. The present invention, capable of punching up to 150 characters per second, therefore provides a significant advantage in speed without complicating the design of the mechanism and significantly increasing the cost thereof. It also provides the significant advantage of automatic error-detection not provided by the prior art.

Accordingly, it is an object of the present invention to provide a tape perforator capable of producing up to 150 characters per second.

It is a further object to provide a high-speed tape perforator having a parity system for automatically detecting errors in character production.

It is a further object to provide a high-speed tape perforator capable of remote backspacing for the purpose of error-correction.

It is a further object to provide a tape perforator which is capable of high-speed perforation, automatic error-detection, and remote backspacing.

It is a further object to provide a high-speed tape perforator capable of automatic error-detection by means of a parity check which indicates either an "odd" or "even" parity and automatically stops the perforator if the indicated parity differs from the standard parity.

It is a further object to provide an intermittent drive mechanism which includes a stepper for producing reverse movement of the tape.

It is a further object to provide a high-speed tape perforator wherein a complete revolution of an eccentric is produced by a partial rotation of a larger clutch gear to thereby cause one complete reciprocation of a punch pin.

Further objects and advantages may become apparent with reference to the specification which follows and the drawings, which represent a specific embodiment of the invention.

Figure 11:
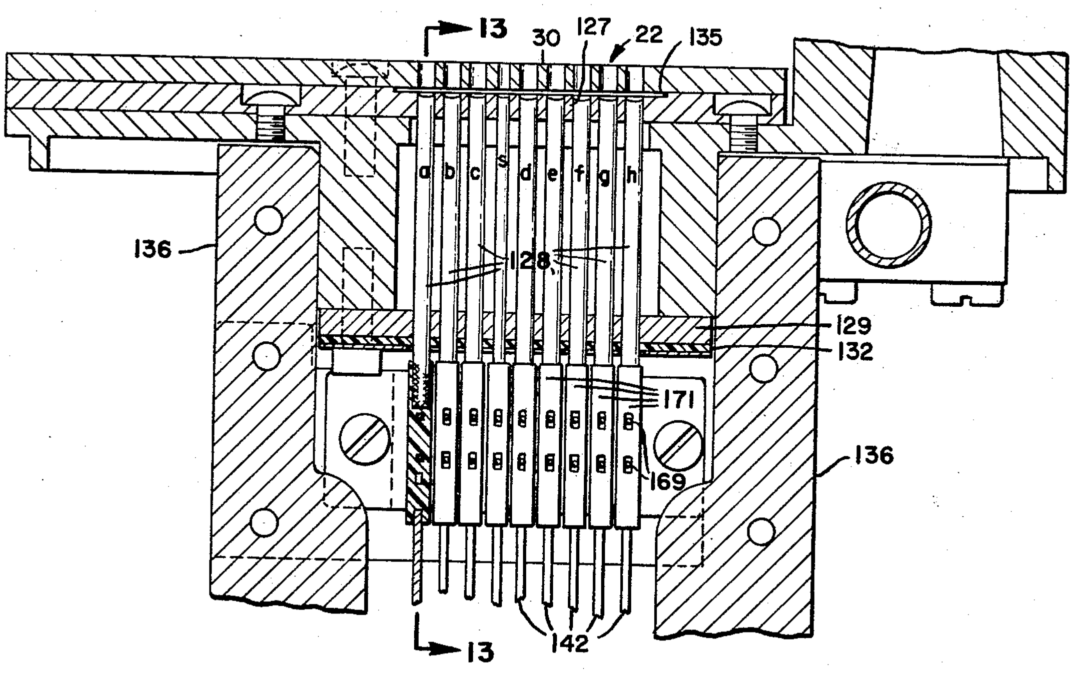
FIG. 11 is a sectional view of the punch head assembly and parity system, and shows the relationship of the two to the tape deck, stripper die, and die block.
Figure 13:
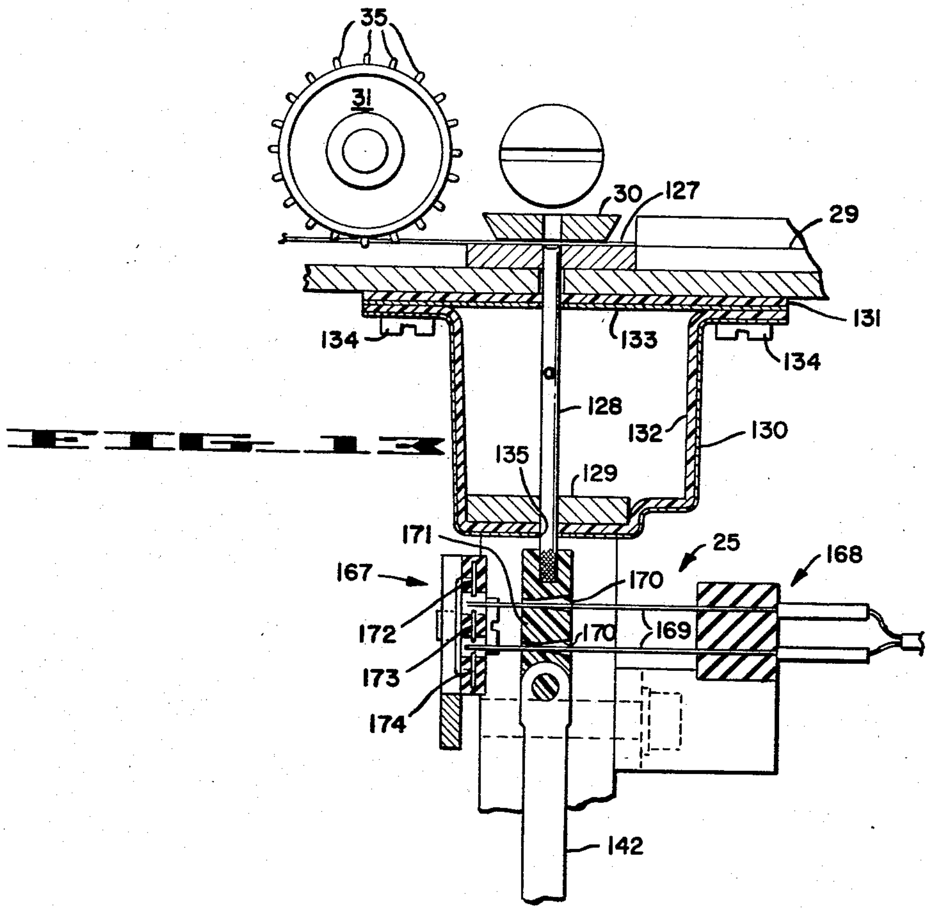

FIG. 13 is a sectional view taken on the line 13—13 of FIG. 11 and shows the parity system, its relationship with the perforator arm and punch pins. It also shows the relationship of the punch pins with the tape deck, stripper die and die block. In addition, it provides a view of the chad auger, the oil baffle and capstan.

Figures 14, 15:
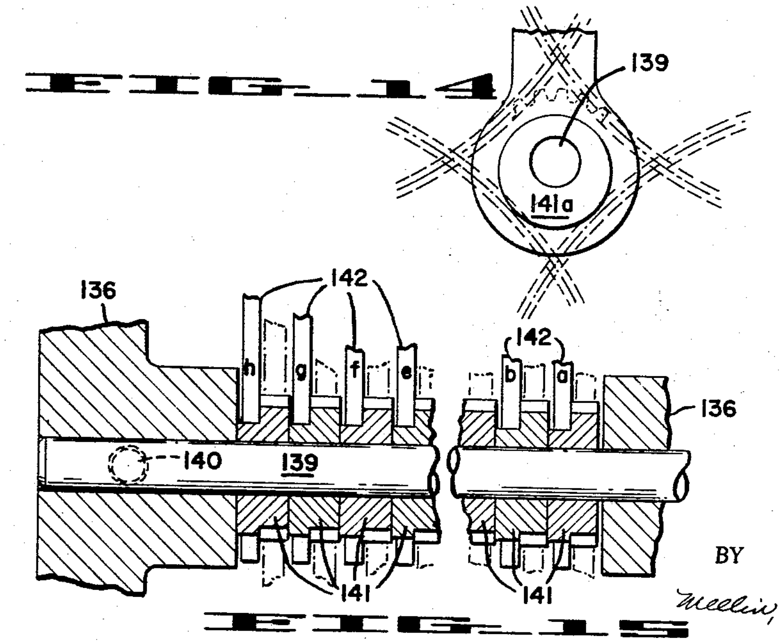

FIG. 14 is a sectional view taken on the line 14—14 of FIG. 15, and shows the relationship of the tape perforator clutch gear, the eccentric, the pivot shaft, and the tape perforator arm.

Figure 8:
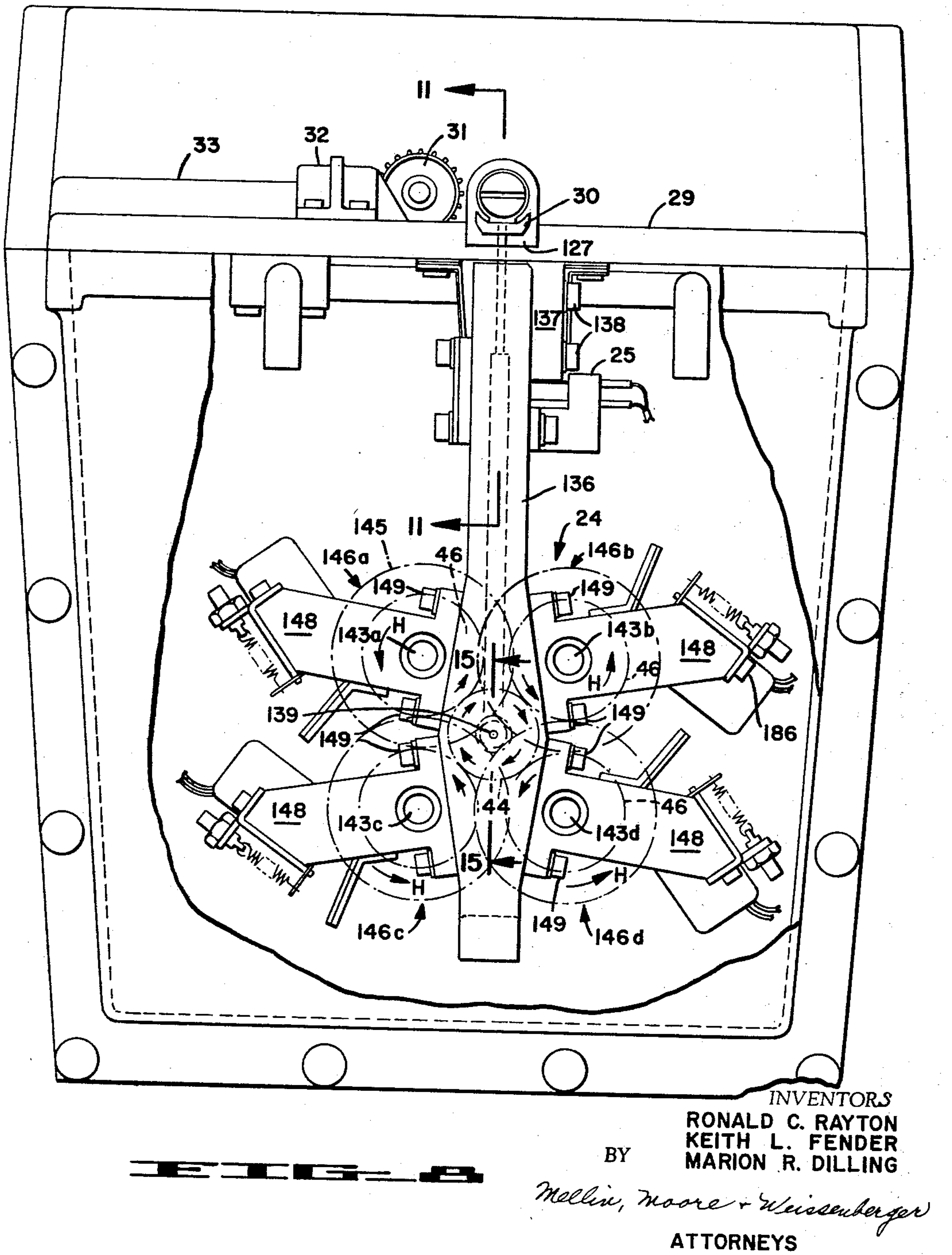
FIG. 8 is a sectional, cutaway view of the tape perforator mechanism taken on the line 8—8 of FIG. 1. It provides a front view of the perforating mechanism and shows its relationship with the parity system and the tape deck.

FIG. 15 is a broken, partial sectional view taken on the line 15—15 of FIG. 8. It shows the pivot shaft, eccentrics, and their relationship with the tape perforator arms.

Figure 16:
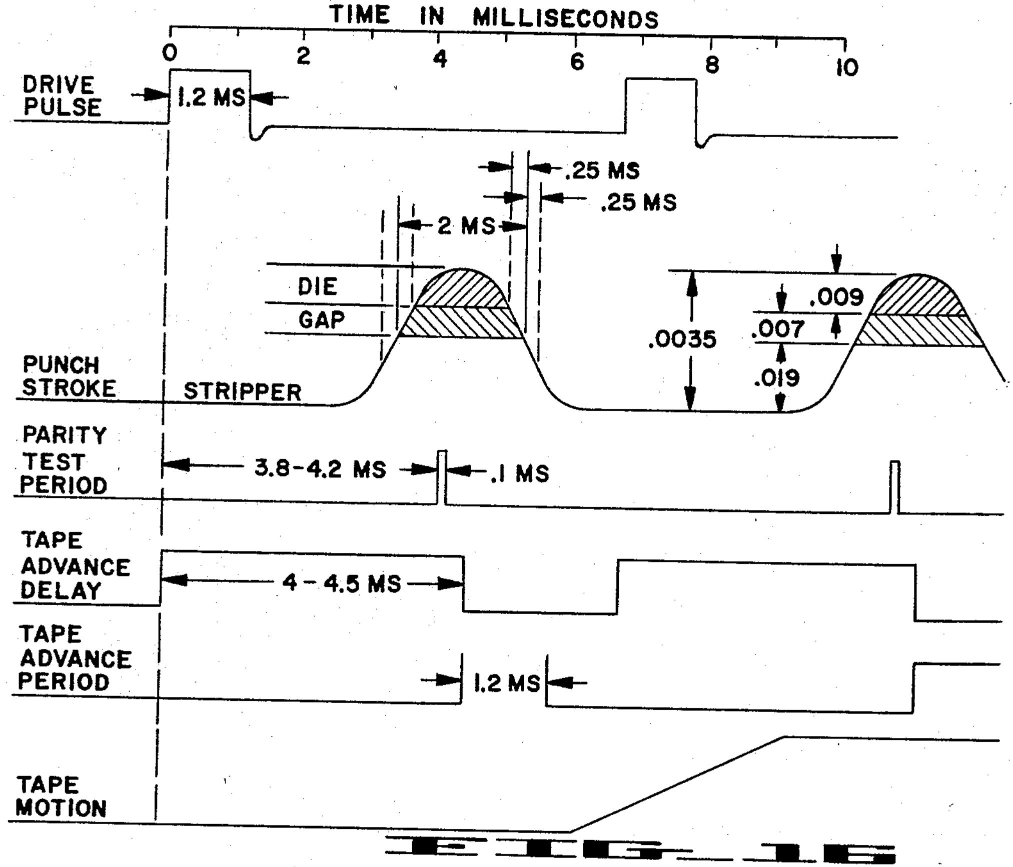

FIG. 16 is a timing diagram which shows the coordination of the drive pulse, punch stroke, parity test period, and tape advance for forward motion of the tape.

Figure 17:
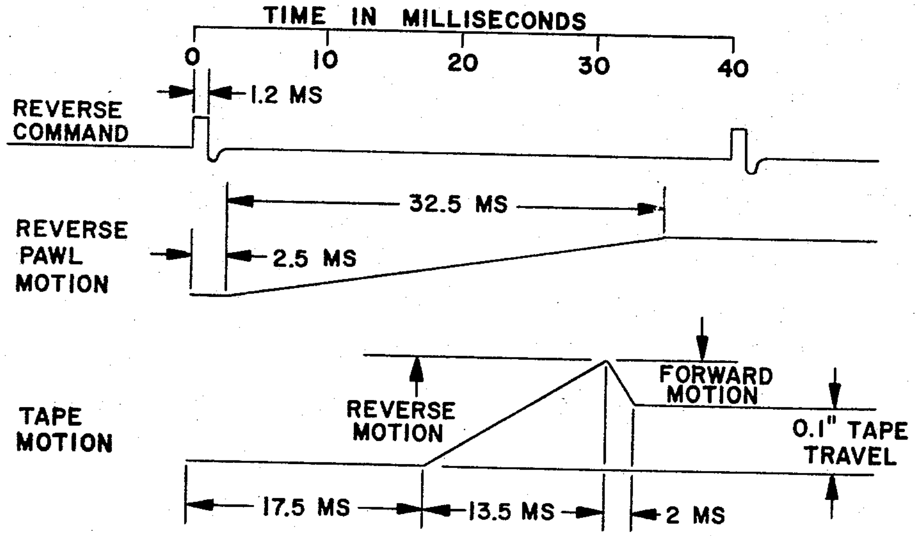

FIG. 17 is a timing diagram which shows the sequential operation in reverse movement of the tape.

Figure 18:
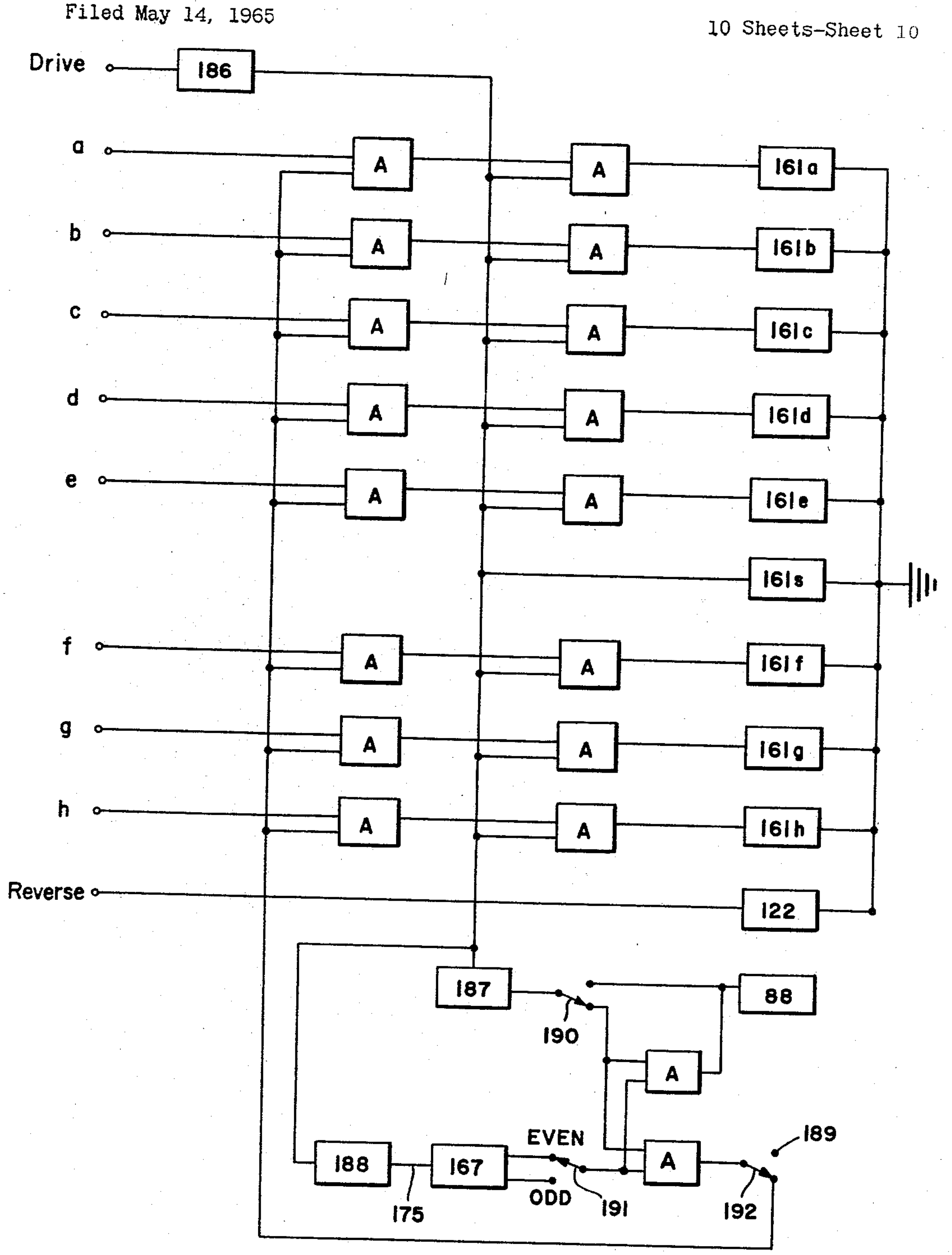

FIG. 18 is a schematic diagram of a representative circuit for asynchronously operating the tape perforator, the parity system, and automatically stopping the perforator in the event that the parity check indicates error.

Figure 1:
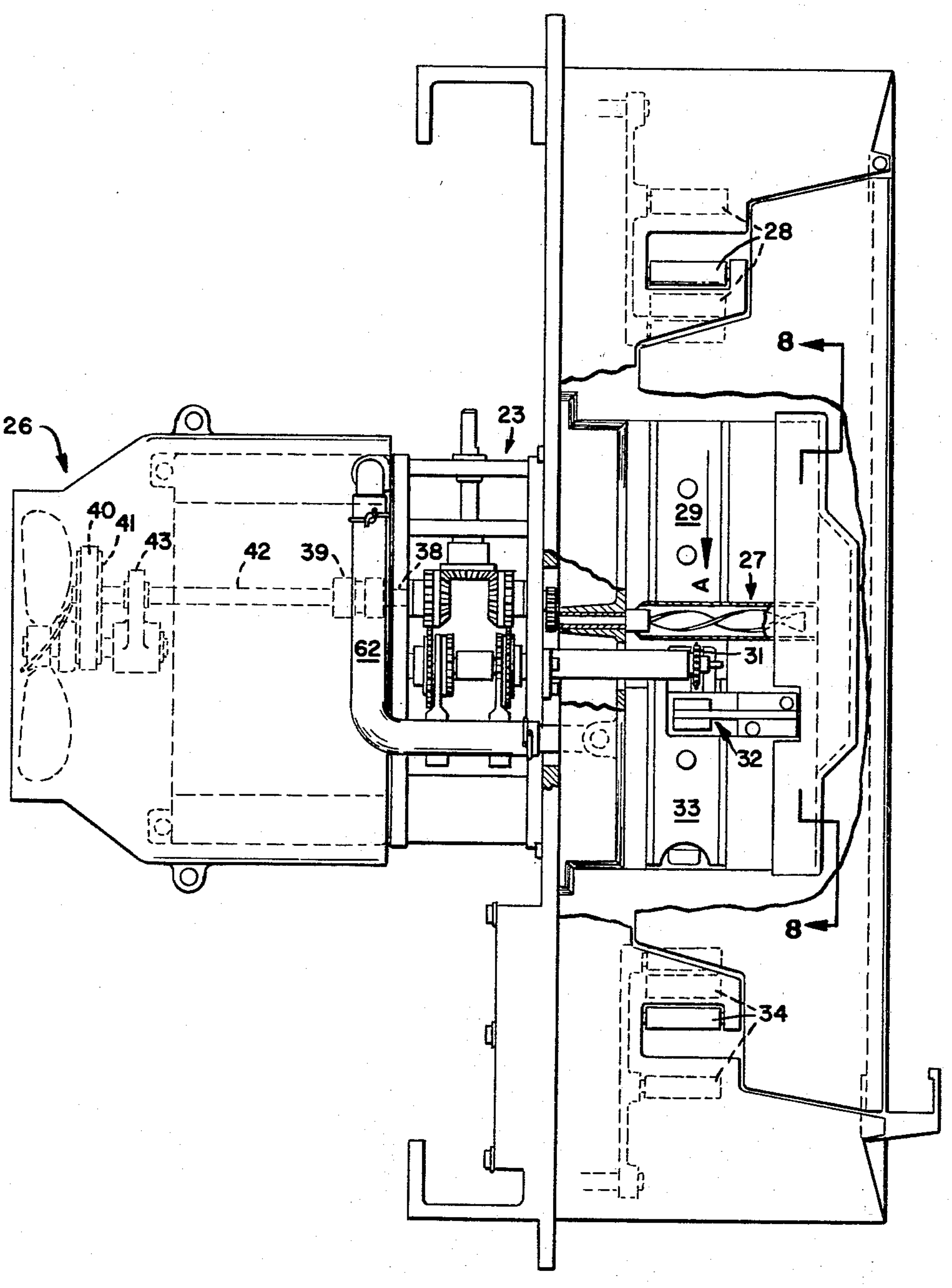
FIG. 1 is a top or plan view of the tape perforator and generally shows the relationship of the frame, motor, capstan drive mechanism, cooling and lubricating system, and the chad disposal system.
Figure 2:
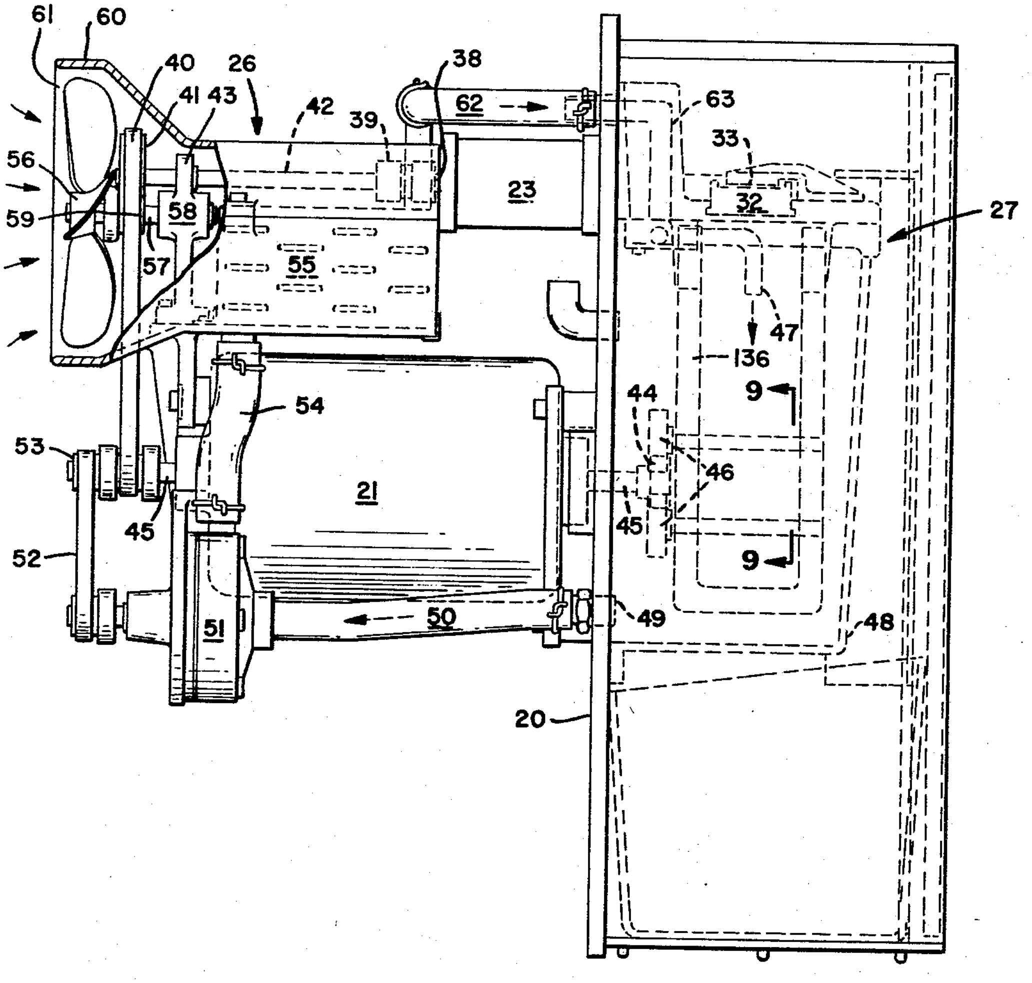
FIG. 2 is a side view of the tape perforator, and shows the relationship of the frame, motor capstan drive mechanism, perforator mechanism, cooling and lubricating system, and the chad disposal system.

A general view of the invention is provided by FIGS. 1 and 2. In general, the structural elements include a frame 20, motor 21, punch-head assembly 22, capstan drive mechanism 23, perforator mechanism 24, a parity system 25 (see FIGS. 8 and 13), a cooling and lubricating system 26, and a chad disposal system 27. Although the present invention resides primarily in the capstan drive mechanism 23, the perforator mechanism 24 and the parity system 25, a general understanding of the over-all operation of the tape perforator facilitates an understanding of the individual structural assemblies.

Figure 3:
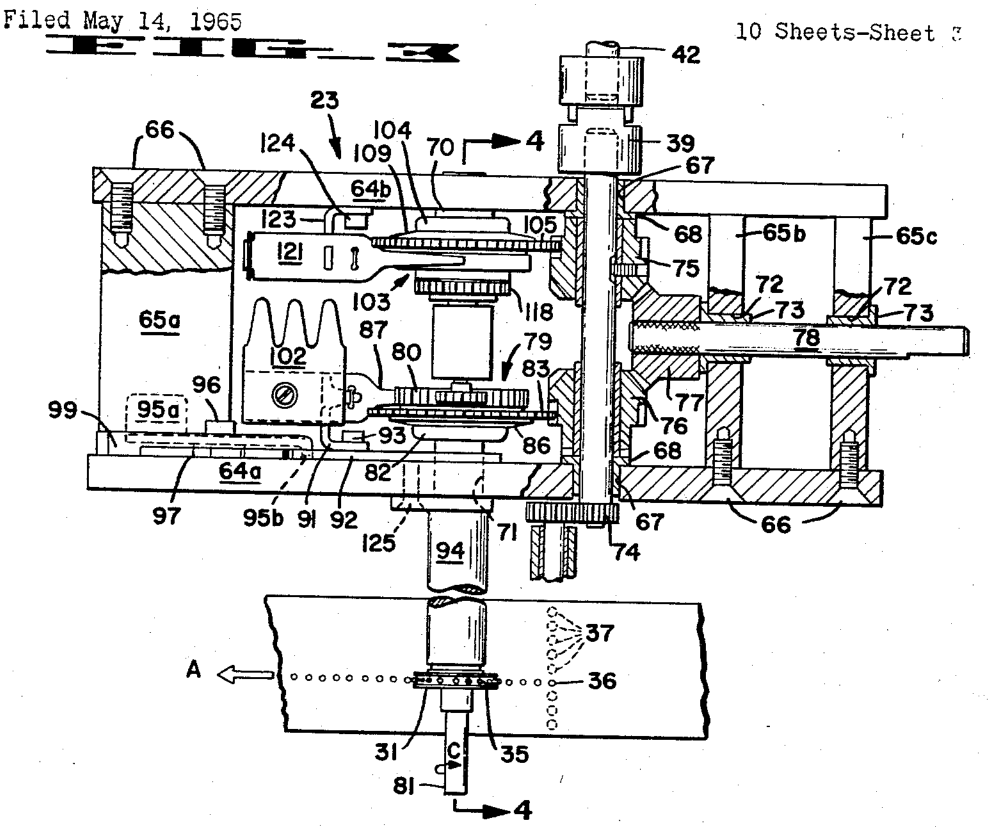
FIG. 3 is a plan view of the capstan drive mechanism, and in addition provides a view of the tape and shows its relationship to the drive mechanism.

Tape T (see FIG. 3) is fed in the direction of arrow A of FIG. 1, over and about input rollers 28, over tape deck 29, beneath die block 30 and capstan 31 through retainer 32, over retainer deck 33, over and about output rollers 34, and finally to a take-up reel not shown. As best seen in FIG. 3, the tape is intermittently driven by capstan 31, the sprocket pins 35 of which engage sprocket holes 36 of tape T. Both sprocket holes 36 and data holes 37 are punched in tape T as it pauses momentarily beneath die block 30.

Capstan 31 is intermittently driven (which will be described in detail below) by rotational power applied to capstan drive shaft 38 at coupling 39. Rotational power is derived from motor 21 and transmitted through belt 40 and belt pulley 41, which is keyed to shaft 42. Shaft 42 is journaled for rotation in fan bracket 43 and is keyed to coupling 39.

Motor 21 also drives perforator mechanism 24. Perforator drive gear 44 is keyed to motor drive shaft 45 and engages four clutch shaft gears 46, only two of which appear in FIG. 1. Both sprocket holes 36 and data holes 37 are punched in tape T by perforator mechanism 24 as tape T pauses beneath die block 30.

The perforator mechanism 24 is cooled and lubricated by oil circulated through cooling and lubricating system 26. The oil is sprayed from nozzles 47 into oil pan 48 and is removed therefrom at sump 49 through hose 50. Centrifugal pump 51 is driven by belt 52 over belt pulley 53, which is keyed to motor drive shaft 45. After passing through pump 51, the oil travels through hose 54 and circulates horizontally through radiator 55, where it is cooled by air circulated by fan 56. Fan 56 is keyed to fan shaft 57, which is cantilevered from fan bracket 43 and rotatable in fan bearing 58. Pulley 59 is keyed to fan shaft 57 and engages fan belt 40 to thereby rotate fan 56. Fan 56 and radiator 55 are housed in fan housing 60, which has a circular intake 61. The cooled oil exits from radiator 55 through hose 62 and flows through distributor pipe 63 and out nozzles 47 to complete the cooling and lubricating cycle.

With the foregoing understanding of the general overall operation of the tape perforator, a detailed description of the capstan drive mechanism, tape perforator mechanism and parity system, as well as the punch-head assembly and chad disposal system, may be better understood.

*The capstan drive mechanism*

The capstan drive mechanism 23 appears in FIGS. 2–7. With particular reference to FIG. 3, it includes two parallel sides 64*a* and 64*b* spaced and secured by spacers 65*a*, 65*b* and 65*c* and screws 66. Sides 64 define aligned capstan drive shaft apertures 67, which contain bearings 68. Sides 64 also define reverse clutch shaft aperture 69, which contains bearing 70 and is aligned with capstan shaft aperture 71. Spacers 65*b* and 65*c* define aligned idler shaft apertures 72 which contain idler shaft bearings 73.

Capstan drive shaft 38 is mounted for rotation in bearings 68 and has coupling 39 keyed to one end and chad auger drive gear 74 keyed to the other end. Reverse clutch spur and bevel gear 75 is fixed to shaft 38. Forward clutch spur and bevel gear 76 is rotatable on shaft 38. Idler gear 77 meshes with gears 75 and 76 and is keyed to idler shaft 78, which is rotatable in bearings 73.

Figure 4:
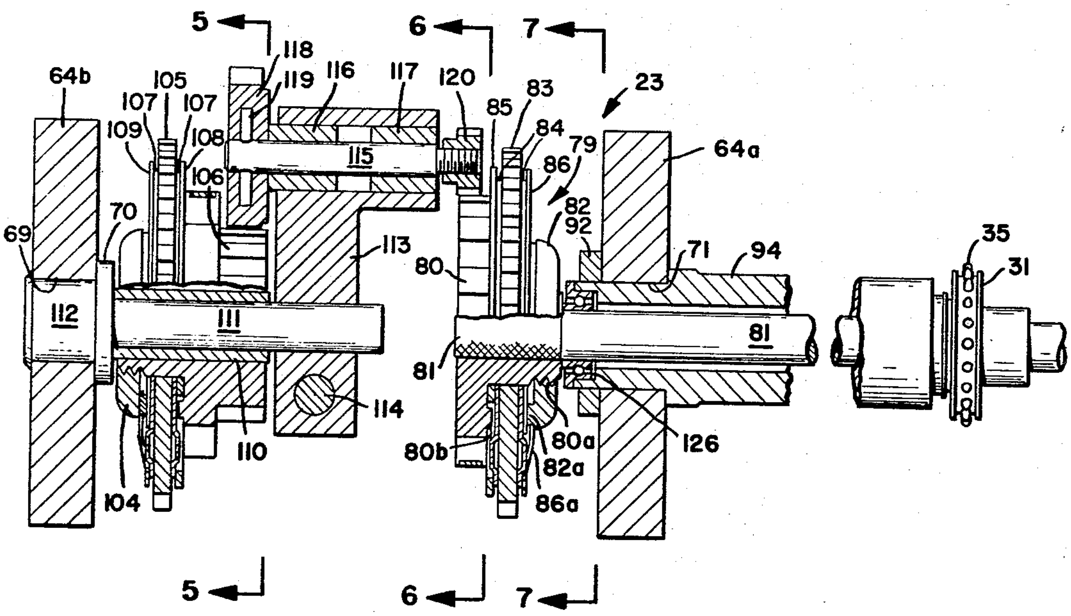
FIG. 4 is a sectional view of the capstan drive mechanism taken on the line 4—4 of FIG. 3. It provides a section view of the forward and reverse clutch assemblies and the stepper mechanism.

Forward clutch assembly 79 appears generally in FIGS. 3 and 4. It includes forward escapement gear 80, which is keyed to capstan shaft 81. Gear 80 has a threaded neck portion 80*a* which threadably engages retainer cap 82. Forward clutch drive gear 83 is rotatably mounted on neck portion 80*a* between fiber washers 84 and disk 85 and spring washer 86. Disk 85 and spring washer 86 are rotatably fixed with relation to forward escapement gear 80 and retainer cap 82 by means of a series of lugs 80*b* and 82*a* respectively. Lugs 80*b* engage disk 85 at accommodating radially extending voids in disk 85. Lugs 82*a* engage inwardly radially extending prongs 86*a* of spring washer 86. Retainer cap 82 may be tightened on neck 80*a* toward forward escapement gear 80 to thereby frictionally engage forward clutch gear 83 between fiber washers 84. Forward clutch gear 83 is meshed with the spur gear of forward clutch spur and bevel gear 76. When rotational power is applied to capstan drive shaft 38, forward clutch gear 83 is therefore rotated. If forward escapement gear 80 cannot rotate, the clutch slips. If forward escapement gear 80 is free to rotate, the clutch does not slip and capstan shaft 81 is rotated.

Figures 6, 7:
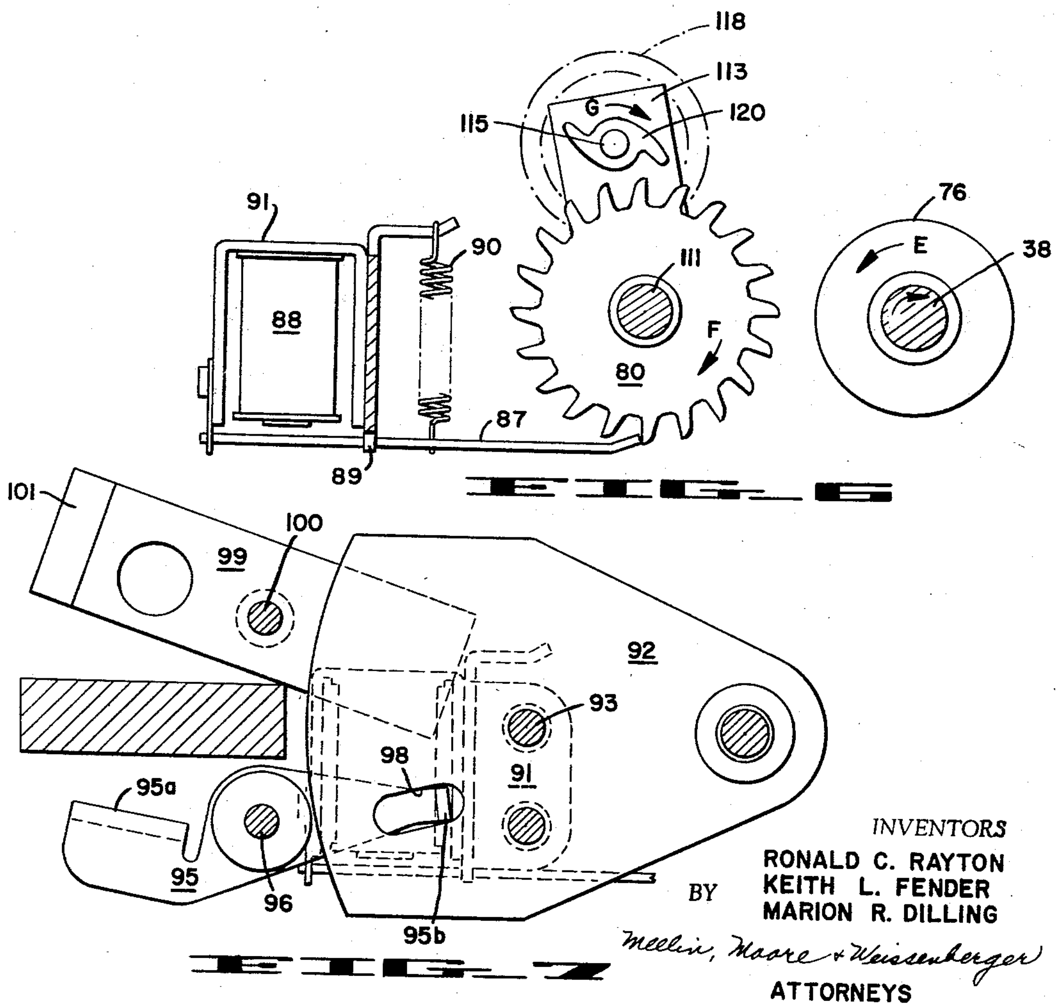
FIG. 6 is a sectional view taken on the line 6—6 of FIG. 4, and shows the forward clutch escapement gear, the forward clutch escapement mechanism and its relationship with the stepper.
FIG. 7 is a sectional view taken on the line 7—7 of FIG. 4, and shows the elements which provide a means for adjusting the position of the forward clutch escapement mechanism which varies the relationship of the forward clutch escapement armature and the forward clutch escapement gear teeth.

Forward escapement armature 87 of forward escapement coil 88 engages forward escapement gear 80 as shown in FIG. 6. Forward escapement armature 87 is pivotable about fulcrum 89 and is held in engagement with forward escapement gear 80 by coil spring 90.

Coil 88 is mounted to coil bracket 91, which is, in turn, mounted to plate 92 by means of screws 93. Plate 92 is seated on capstan sleeve 94 and may thereby be pivoted about shaft 81 to vary the angle between forward escapement armature 87 and a line drawn tangentially to forward escapement gear 80 at the point of contact with armature 87. Adjusting lever 95 is pivotally mounted to side 64*a* by screw 96 and is spaced therefrom by bushing 97. One end of adjusting lever 95 is flanged to provide a handle 95*a*. The other end is provided with an arm 95*b*, which extends into slot 98 of plate 92. Clamp 99 is secured to side 64*a* by means of screw 100 and contains step 101 which has a height equal to the thickness of plate 92. When screw 100 is tightened, clamp 99 therefore secures plate 92 against side 64*a*. When screw 100 is loosened, however, plate 92 may be pivoted about capstan shaft 81 and fine adjustments in the position of plate 92 may be made by means of adjusting lever 95.

A dissipator 102 is mounted to coil 80 for the purpose of conducting heat therefrom.

Figure 5:
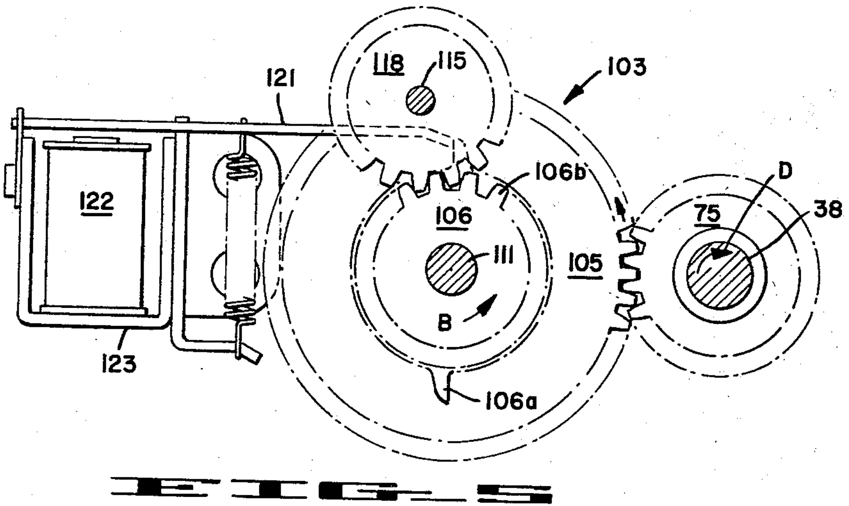
FIG. 5 is a sectional view taken on the line 5—5 of FIG. 4 and shows the stepper drive gear and its relationship with the reverse clutch assembly, the reverse clutch drive gear, and the reverse clutch escapement mechanism.

Reverse clutch assembly 103 appears generally in FIGS. 3–5. It is similar to forward clutch assembly 79 and includes retainer cap 104, reverse clutch gear 105 and reverse escapement and spur gear 106, which is integrally comprised of escapement gear 106*a* and spur gear 106*b*. Fiber washers 107 are provided between disk 108 and spring washer 109. The elements of the reverse clutch assembly are rotatably mounted on busing 110, which is mounted on reverse clutch shaft 111. Reverse clutch shaft 111 is cantilevered from side 64*b* by means of plug 112, which is inserted into reverse clutch shaft aperture 69.

Reverse clutch assembly 103 is retained on shaft 111 by stepper mounting bracket 113, which is securely clamped to an end of shaft 111 by means of screw 114. Stepper shaft 115 is rotatable in bushings 116 and 117 and has stepper drive gear 118 fixed to one end by pin 119. Stepper 120 is threadably engaged on the other end of shaft 115, for which purpose stepper shaft 115 is threaded in a direction such that stepper 120 tightens on shaft 115 when turnel in a counterclockwise direction, as viewed in FIG. 6. Stepper drive gear 118 is meshed with spur gear 106*b* and therefore when spur gear 106*b* rotates, spur 120 also rotates.

As best viewed in FIG. 5, reverse escapement armature 121 engages reverse escapement gear 106*a* to thereby prevent rotation thereof in the direction of arrow B. As long as the rotation of reverse escapement gear 106a is so restricted, reverse clutch gear 105 slips and spur gear 106b does not rotate. Reverse escapement armature 121 is operated by reverse escapement coil 122 in the same manner as forward escapement armature 87. Reverse escapement coil 122 is mounted to bracket 123, which is secured to plate 64 by screws 124.

Capstan sleeve 94 is secured to plate 64 by screws 125. Capstan shaft 81 rotates therein on bearings 126. Capstan 31 is fixed to capstan shaft 81 for rotation therewith.

The capstan drive mechanism is designed as described above so that capstan 31 may be intermittently driven forward (in the direction of arrow C in FIG. 3) at the rate of up to 150 increments per second. The design also, however, allows a reversal of the tape T. The forward and reverse operation of capstan drive mechanism 23 is accomplished with rotation applied to capstan drive shaft 38 and controlled by the operation of forward escapement armature 87 and reverse escapement armature 121. Capstan drive shaft 38 is driven at a constant rate in the direction of arrow D in FIG. 5. Reverse clutch gear 106, in engagement with the spur portion of reverse clutch spur and bevel gear 75, rotates in the direction of arrow B in FIG. 5.

Idler gear 77, meshed with both reverse clutch spur and bevel gear 75 and forward clutch spur and bevel gear 76, causes the latter to rotate in the direction of arrow E in FIG. 6. Forward clutch gear 83 is therefore caused to rotate in the direction of arrow F, although forward clutch gear 83 is not shown. The rotation of capstan drive shaft 38 in the direction of arrow D in FIG. 5 therefore causes reverse clutch gear 106 to rotate in one direction (arrow B) and forward clutch gear 83 to rotate in the opposite direction (arrow F). Both forward and reverse clutch gears 83 and 106 respectively slip with respect to their associated escapement gears as long as forward and reverse escapement armatures 87 and 121 engage their respective escapement members. With forward and reverse escapement armature 87 and 121 so engaged, capstan shaft 81 and capstan 31 remain stationary.

Forward escapement armature 87 may be pivoted about fulcrum 89 and thereby disengaged from forward escapement gear 80 by energizing or pulsating forward escapement coil 88. Forward escapement armature 87 therefore releases one tooth of forward escapement gear 80. Since there are 20 teeth on forward escapement gear 80, the release of one allows capstan shaft 81 to revolve for $\frac{1}{20}$ of a revolution and move tape T forward one increment. With forward clutch gear 83 constantly rotating, capstan shaft 81 may be caused to advance $\frac{1}{20}$ of a revolution each time forward escapement coil 88 is pulsed. Each time forward escapement armature 87 releases forward escapement gear 80, forward clutch assembly 79 ceases to slip and forward escapement gear 80 rotates $\frac{1}{20}$ of a revolution. Capstan 31 is therefore driven in the direction of arrow C in FIG. 3, and tape T is driven in the direction of arrow A.

To reverse capstan 31, reverse escapement armature 121 is disengaged from reverse escapement gear 105a by energizing reverse escapement coil 122. With reverse clutch gear 105 rotating in the direction of arrow B in FIG. 5, the release of escapement gear 106a allows spur gear 106b to rotate ½ a revolution, since reverse escapement gear 106a has but two diametrically opposed teeth. Stepper drive gear 118, meshed with spur gear 106b, also rotates ½ a revolution, as does stepper 120. The rotation of stepper 120 in the direction of arrow G in FIG. 6 causes one tooth to engage a tooth of forward escapement gear 80. Forward escapement gear 80 is therefore caused to rotate in a direction opposite the direction of arrow F in FIG. 6 for a distance of one and one-half increments. When forward esecapement gear 80 is so rotated by stepper 120, forward clutch assembly 79 is caused to slip at a rate greater than the rate of slippage when forward clutch gear 83 remains stationary. When stepper 120 completes its one-half revolution and becomes disengaged from forward clutch gear 83, the slippage of forward clutch assembly 79 causes forward clutch gear 83 to rotate in the direction of arrow F in FIG. 6, one-half an increment until forward escapement prong 87 engages a tooth of forward clutch gear 80. Thus, by pulsating reverse escapement coil 122, forward escapement gear 80 is caused to rotate for one increment in a direction opposite arrow F in FIG. 6, which therefore causes capstan shaft 81 and capstan 31 to reverse tape T a distance of one increment. Reverse escapement coil 122 may be pulsated to allow a random reversal of tape T until tape T is sufficiently reversed.

It may therefore be seen that by selective operation of forward and reverse escapement coils respectively, capstan 31 may be caused to rotate in either a forward or reverse direction. Tape T is punched during forward operation of capstan 31 when forward escapement armature 87 is momentarily in engagement with forward escapement gear 80 and the tape is therefore momentarily at rest.

*Punch-head assembly*

The punch-head assembly appears in FIGS. 8, 11 and 13. It includes die block 30, stripper die 127, a series of punch pins 128, a pin guide 129, and a sealed oil baffle 130. Punch pins 128 include data pins 128a–h and sprocket pin 128s. Oil baffle 130 is sealed by upper seal 131 and liner 132 and includes cover plate 133, all of which are secured to deck 29 by screws 134. Punch pins 128 are mounted for reciprocation in oil baffle 130 for a stroke that has its upper limit in die block 30 and its lower limit in stripper die 127. Stripper die 127 is provided with a recess 135, which accommodates tape T.

The punch-head assembly 22, as shown, includes eight data pins 128a–h and one sprocket pin 128s, which is smaller in diameter. The number of data pins may, however, vary and the position of the punch pin 128s with relation to the data pins may also vary.

*Tape perforator mechanism*

The perforator mechanism appears in FIGS. 8, 9, 10, 14 and 15. The mechanism is mounted to a U-shaped bracket 136 which is secured to deck 29 by means of integrally formed studs 137 and screws 138 (see FIG. 8). A pivot shaft 139 is mounted in bracket 136 and secured in place with set screws 140, one of which appears in FIG. 15. Nine punch drive spur gear eccentrics 141 are rotatable on shaft 139 and are also rotatable in perforator arms 142. As spur gear eccentrics 141 rotate on shaft 139, perforator arms 142 are caused to reciprocate.

Figures 9, 10:
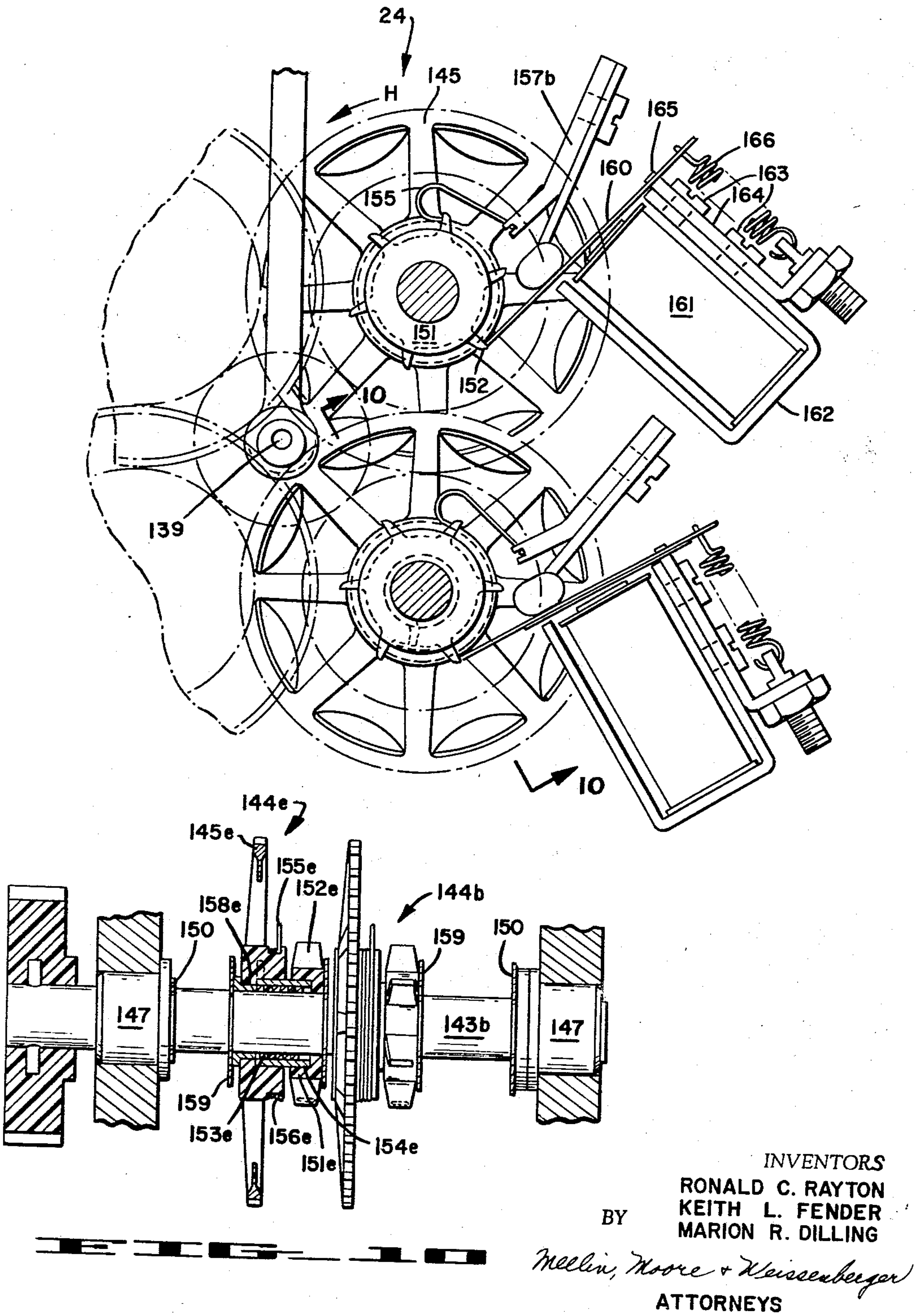
FIG. 9 is a sectional view taken on the line 9—9 of FIG. 2 and shows two clutch banks, including a view of the perforator clutch assembly and its relationship with the escapement mechanism, eccentric, and perforator arm.
FIG. 10 is a partial sectional view taken on the line 10—10 of FIG. 9. It shows a clutch bank and provides a sectional view of one clutch assembly and a side view of another.

Perforator or connector arms 142 are reciprocated by rotation of eccentrics 141, which are asynchronously operated by perforator drive gear 44, clutch shaft gear 46 keyed to clutch shaft 143 and a clutch assembly 144 (see FIG. 10). Clutch assembly 144 includes clutch gear 145, which engages eccentric 141 and has a pitch diameter six times that of eccentric 141 so that one-sixth of a revolution of clutch gear 145 causes eccentric 141 to rotate one complete revolution. Each data pin 128a–h has a corresponding clutch assembly 144a–h, and sprocket pin 128s is operated by clutch assembly 144s. Clutch assemblies 144 are arranged in four clutch banks 146a–d. Clutch banks 146a–c each contain two clutch assemblies, and clutch bank 146d contains three, making a requisite total of nine. Clutch banks 146a–d include clutch shafts 143a–d respectively, which are rotatably mounted in bearings 147 in clutch bank brackets 148. Clutch bank brackets 148 are secured to perforator mounting bracket 136 by screws 149.

Since each of the four clutch banks 146a–d are similar, it is necessary to describe the structure and operation of only one. For that purpose, reference is made to clutch bank 146b (see FIG. 10), which includes clutch assemblies 144b and *e*, which operate eccentrics 141b and *e* and punch pins 128b and *e*, respectively.

With reference to FIG. 10, clutch assemblies 144b and *e* are identical, and each is mounted to clutch shaft 143b. Clutch shaft 143b is secured between bearings 147 by snap rings 150 and is driven at a constant rate in the direction of arrow H in FIGS. 8 and 9. The constant rotation of clutch shaft 143b is translated into intermittent rotation of eccentric 141e by means of clutch assembly 144e.

Clutch assembly 144e is similar to the clutch assembly discussed in United States Patent No. 3,064,882 entitled "Tape Perforator," which issued Nov. 20, 1962. The clutch assemblies are identical except that clutch assembly 144e has a clutch gear 145e in place of the camming eccentric disclosed therein, and the escapement wheel has six teeth instead of two. Clutch assembly 144e includes escapement wheel 151e, which contains six equally spaced escapement teeth 152e and is rotatable on shaft 143b. Coil clutch spring 153e has one end thereof embeded in clutch gear 145e (see FIG. 9) and has a relaxed inside diameter slightly less than the diameter of clutch shaft 143b. Clutch spring 153e has a rectangular cross section (see FIG. 10) to provide maximum contact with shaft 143b, thereby reducing the tendency of the spring to score the shaft. Sleeve 154e houses spring 153e and has an inside diameter sufficient to provide working clearance for spring 153e as it unwinds to thereby release its grip on shaft 143b. The opposite end of spring 153e is inserted into a slot in escapement wheel 151e (see FIG. 9). Rebound coil spring 155e is seated in recess 156e of clutch gear 145e and has one end fixed to rebound spring bracket 157b as best seen in FIG. 9. The opposite end is free and spring 155e has a relaxed inside diameter less than the diameter of recess 156e. A flanged bushing 158e is provided as shown in FIG. 10, and snap rings 159 hold the assembly together on shaft 143b.

As best viewed in FIG. 9, escapement armature 160 engages a tooth 152 of escapement wheel 151 to prevent rotation thereof in the direction of arrow H. Escapement armature 160 is disengageable from escapement tooth 152 by pulsating escapement coil 161, which is mounted to bracket 162. Bracket 162 is secured by screws 163 to bracket 164, which is in turn secured to clutch bank bracket 148 by screws 186 (see FIG. 8). Energizing escapement coil 161 pivots escapement armature 160 about fulcrum 165 against the action of escapement coil spring 166 to thereby release escapement tooth 152.

Clutch spring 153e is wound in a direction opposite arrow H in FIG. 9 when viewed from right to left in FIG. 10. Rebound spring 155 is wound in the opposite direction. Shaft 143b is rotated at a constant rate in the direction of arrow H in FIG. 9 by drive gear 44.

Clutch assembly 144e operates as follows: escapement coil 161 is momentarily energized or pulsed to release escapement prong 160 from engagement with escapement tooth 152. Escapement wheel 151 is therefore free to rotate and, when no longer restrained, ceases to tend to unwind coil clutch spring 153. Thus released, coil clutch spring 153 grips shaft 143, since its relaxed inside diameter is less than the diameter of shaft 143. Since one end of coil clutch spring 153 is embedded in clutch gear 145, as clutch spring 153 grips rotating shaft 143, clutch gear 145 is caused to rotate in the direction of arrow H in FIG. 9. Clutch gear 145 rotates for one-sixth of a revolution until the succeeding escapement tooth 152 is brought into engagement with escapement prong 160. The one-sixth revolution of clutch gear 145 causes eccentric 141 to make one complete revolution, which causes one reciprocation of perforator arm 142.

As the succeeding tooth 152 engages escapement prong 160, rebound coil spring 155 is brought into operation. Due to the direction of winding of rebound coil spring 155 in recess 156 of clutch gear 145, when clutch gear 145 rotates in the direction of arrow H in FIG. 9, rebound coil spring 155 does not grip recess 156. When such rotation is terminated, however (by the engagement of escapement tooth 152 with escapement prong 160), then rebound coil spring 155 grips recess 156 to prevent the clutch from rotating backward. Backward rotation of the clutch would permit spring 153 to drag on the shaft (clutch inertia is designed to overthrow enough to expand spring 153 during idle period).

The over-all operation of the perforator mechanism is merely a series of operations as described in connection with individual clutch assembly 144e. With reference to FIGS. 2 and 8, perforator drive gear 44 engages each of the four clutch shaft gears **46*a–d* to thereby rotate clutch shafts 143*a–d* in the direction of arrow H at a rate of about 2600 r.p.m. Escapement coils 161*a–h*** and *s* are discriminately asynchronously energized to release escapement wheels **151*a–h*** and *s*, respectively, to thereby rotate clutch gears **145*a–h*** and *s*, respectively. Clutch gears **145*a–h*** and *s* cause rotation of eccentrics **141*a–h*** and *s*, which thereby reciprocates punch pins **128*a–h*** and *s* to perforate tape T.

The clutch gear 145, as previously stated, has a pitch diameter six times that of the pitch diameter of spur gear eccentric 141. The ratio of diameters is therefore six, and six equally spaced escapement teeth 152 are provided on escapement wheel 151. One-sixth of a revolution of escapement wheel 151 therefore occurs between successive engagements of escapement teeth 152 by escapement armature 160. Consequently, clutch gear 145 also completes one-sixth of a revolution between successive engagements and spur gear eccentric 141 is caused to rotate one complete revolution to thereby reciprocate punch pin 128. It will be understood that the specific number of escapement teeth is not critical. It is critical, however, that spur gear eccentric complete one revolution for each incremental movement of clutch gear 145. For that purpose the number of equally spaced escapement teeth must be equal to the ratio of the diameter of the clutch gear 145 to the diameter of the spur gear eccentric and the ratio must be a whole number. Thus, the ratio of diameters may vary from two to a number greater than six and the number of equally spaced escapement teeth 152 must correspondingly vary.

*The parity system*

The parity system appears in FIGS. 8 and 11–13. With particular reference to FIG. 13, it includes four stationary parity contact assemblies 167 and eight movable parity contact assemblies 168. Each of the four stationary contact assemblies 167 serves a pair of movable contact assemblies. Each movable contact assembly 168 includes a pair of flexible conductive parity sensors 169 which are arranged with one above the other to thereby constitute an upper and lower sensor. One pair of sensors extends through parity sensor apertures 170 in parity block 171 of each of the data pins **128*a–h*. Since sprocket pin 128s is always actuated and it has no relation to data recordation, no parity sensors are necessary to detect its actuation. Parity blocks 171*a–h* are molded to perforator arm 142 and molded about the knurled portion of data pins 128. Parity sensor apertures 170 are preferably made with a diverging upper and lower surface extending toward movable parity contact assembly 168**.

Each of the four stationary parity contact assemblies 167 includes an upper contact 172, a middle contact 173, and a lower contact 174. Middle contact 173 is insulated from upper and lower contacts 172 and 174 respectively. In each stationary parity contact assembly the upper contact 172 is connected by a lead to the lower contact 174. In an at-rest position, the upper sensor of parity sensor 169 contacts middle contact 173, and the lower sensor contacts lower contact 174. As tape T is punched, the sensors of the actuated punch pin are forced upwardly by parity block 171, and the upper sensor of parity sensor 169 contacts upper contact 172 and the lower sensor contacts middle contact 173.

Figure 12:
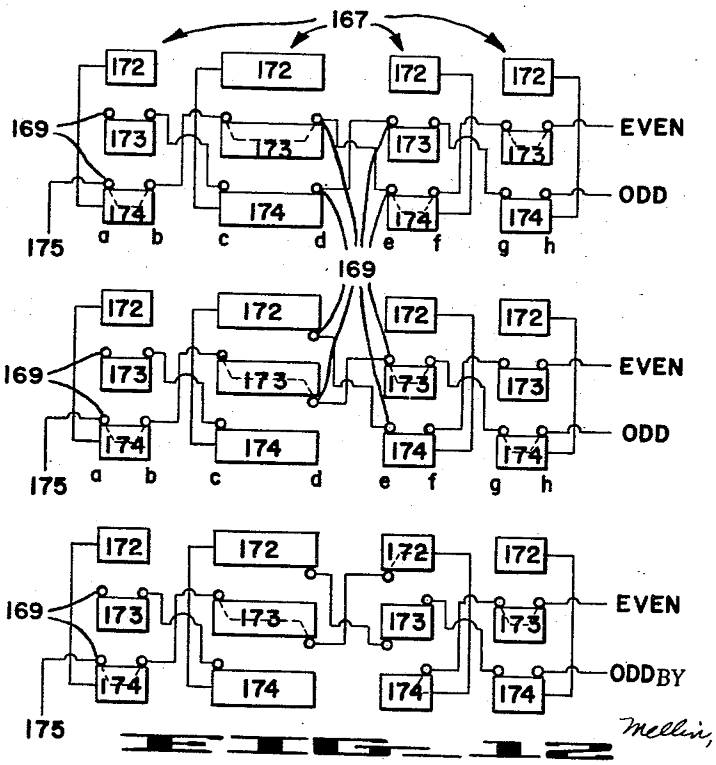
FIG. 12 is a schematic diagram which shows the parity contacts and the relationship with the parity sensors. It shows cross wiring of the parity sensors and the wiring of the parity contacts, which yields an even or odd parity, depending upon the number of parity sensors actuated.

FIG. 13 shows the parity sensors in a neutral position which occurs midway during the stroke of punch pins 128. FIG. 12, however, is a schematic diagram showing the sensors 169 in various positions in contact with stationary parity contact assemblies 167. It also shows the cross connection of sensors 169*b* and *c*, 169*d* and *e*, and 169*f* and *g*. An interrogating input lead 175 is connected to the lower sensor in terminal pair 169*a* (the upper sensor is superfluous). The upper sensor of terminal pair 169*h* is connected to "even" lead 176 and the lower to "odd" lead 177. In FIG. 12*a* the punch pins are in an at-rest position and sensors 169 are shown in contact with the middle and lower contacts 173 and 174. In the position shown in FIG. 12*a*, no perforations have been made in tape T and the parity should indicate "even." Thus, an interrogating input applied at lead 175 is conducted through stationary parity contacts 174*ab*, 173*cd*, 174*ef* and 173*gh* to "even" lead 176. FIG.12*b* shows data pin 128*d* activated with the upper sensor of parity sensor 169*d* in contact with stationary contact 172*cd*, and the lower sensor in contact with stationary contact 173*cd*. Thus, one data pin is activated and the parity system should indicate "odd." That indication is apparent, since an interrogating input applied to lead 175 is conducted through contacts 174*ab*, 173*cd*, 173*ef* and 174*gh* to "odd" lead 177. FIG. 12*c* shows data pins 128*d* and *e* activated, and an "even" parity is indicated since the interrogating input is conducted through contacts 174*ab*, 173*cd*, 172*ef*, 174*ef* and 173*gh* to "even" lead 176.

The parity check therefore provides a system for detecting a malfunction which embraces an odd number of data pins. More particularly, if an odd number of pins malfunction, the parity system will indicate "odd" when it should indicate "even," or "even" when it should indicate "odd." If, however, an even number of data pins are embraced in the malfunction or if compensating malfunctions occur, the parity system will not indicate the malfunction. The vast majority of malfunctions, however, involve only one punch pin, and therefore the parity system is practical and serves to detect the malfunction immediately and stop the tape.

*Chad-removal system*

Chad is the circular portion of the tape that is removed (or punched) therefrom by punch pins 128. It accumulates in die block 30, eventually overflows and must be removed.

The chad-removal system appears in FIGS. 1, 2 and 8. It includes chad auger 178, chad hopper 179, chad chute 180, and chad box 181. Chad auger 178 is rotated by chad auger drive gear 182, which is keyed to capstan drive shaft 38 and engages auger gear 183 (see FIG. 3). Chad hopper 179 slides onto die block 30 and has a cylindrical cavity 184 that accommodates auger 178 for rotation therein. The hopper has a slot 185 extending its length which exposes cavity 184 to die block 30 and provides access to the chad by auger 178.

The chad therefore accumulates in chad hopper 179, is removed therefrom by rotation of chad auger 178, falls down chute 180, and into chad box 181.

*Operation*

The operation of the tape perforator is best understood with reference to FIGS. 16, 17 and 18. FIG. 16 shows the coordination of the perforator mechanism (punch stroke), the parity system, and the capstan drive mechanism (tape advance and tape motion).

The drive pulse is applied discriminately to the perforator mechanism escapement coils 161. It is a 50-volt pulse of 1.2±0.1 milliseconds duration. Separation between pulses is 6⅔ milliseconds, which causes a one-sixth revolution of each clutch gear 145 (whose corresponding escapement coil 161 is pulsed) to thereby cause a punch stroke at the rate of 150 times per second.

The parity test period occurs at 3.8 to 4.2 milliseconds time when the punch pin stroke extends into die block 30. The parity test pulse is applied to interrogating input lead 175 and consists of a 0.1 millisecond pulse of 15–30 volts. The impedance on the output side of the parity sensors 169 should be about 470 ohms to provide sufficient current to break through the oil film present on the sensors 169. Thus a parity test is conducted while the parity sensors 169 are in contact with the upper and middle contacts 172 and 173 respectively for every punch pin 128 actuated. As exemplified by FIG. 12, the parity check yields either an "even" or "odd" parity, depending upon the number of punch pins actuated.

The capstan drive mechanism is operated to advance tape T by the drive pulse delayed 4–4.5 milliseconds.

The forward escapement coil 88 of the capstan drive mechanism is pulsed 4.1 milliseconds after the leading edge of the drive pulse while the punch pins are in the tape T or die block 30. A further delay of about 1.3 milliseconds occurs as a result of the inertia of both the forward escapement armature 87 and the forward clutch assembly 79. Thus tape motion does not begin until approximately 6 milliseconds time when the punch pins 128 are free of tape T, although the forward escapement coil 88 is pulsed during engagement of the punch pin 128 and tape T. The forward motion of tape T therefore occurs from about 6 to 9 milliseconds in time at a rate of 150 increments per second.

The capstan drive mechanism is operated in reverse by pulsing reverse escapement coil 122. As shown in FIG. 17, the reverse command pulse is, like the drive pulse, 50 volts and 1.2 milliseconds duration but has a frequency of about 25 cycles per second. The reverse pawl motion shown represents a one-half revolution of reverse escapement and spur gear 105. The reverse pawl motion causes a rotation of stepper 120 which reverses forward escapement gear 80 to cause a reverse rotation of capstan shaft 81 for one and one-half increments, all of which occurs in 13.5 milliseconds as shown. Stepper 120 is disengaged from gear 80 at 31 milliseconds time, whereupon gear 80 is allowed to rotate in a forward direction for 2 milliseconds so that at time 33 milliseconds gear 80 has been reversed a net of one increment to reverse tape T 0.1″.

For optimum operation the following power requirements are recommended. A one-third hosepower; 3450 r.p.m. AC; 105–125 volts, 60 cycles; 17.5 amps starting current; 4.2 amps full load current; and 2.2 amps normal load current is preferred. The direct current power requirement of the perforator escapement coils is preferably 50±3 volts, 5 amp peak, 20% duty cycle. The direct current power requirement of the capstan drive mechanism (forward and reverse escapement coils) is 50±3 volts, 2.5 amps peak and 20% duty cycle (forward) and 4% duty cycle (reverse).

An exemplary wiring diagram appears in FIG. 18. A 50-volt, 1.2 millisecond drive pulse leaves pulse generator 186, is fed into a series of "and" circuits, A, and into tape advance delay 187. The drive pulse is also utilized in the parity system 167 after being delayed by parity delay 188 and passing through interrogating input lead 175.

The drive pulse is also discriminately fed to data leads *a–h* which connect with a second bank of "and" circuits, A. An error signal contact 189 may be provided in the event that an audio or visual means is preferred for error detection rather than automatic stoppage of the perforator. Automatic stoppage is provided for by "and" circuit, A, placed between tape advance delay 187 and forward escapement coil 88 in conjunction with a second "and" circuit, A, placed between switch 191 and switch 192. Switch 190, when thrown as shown, provides for automatic stoppage of tape T by eliminating the pulse to forward escapement coil 88 in the event that no pulse leaves parity system 167 (which would occur in the event of an error).

The parity pulse from switch 191 (which is shown set for even parity) is fed to "and" circuit, A, as shown along with the pulse from tape advance delay 187. With the switch 192 thrown as shown, the pulse from "and" circuit, A (which occurs only in the event of no error), is fed to the second bank of "and" circuits, A. If the parity is not in error, therefore, a pulse enters the second bank of "and" circuits, A, and if the data lead is also pulsed, the pulse exits from the second bank of "and" circuits, A, and into the first bank and eventually into escapement coils 161*a–h*, depending upon which data leads *a–h* are pulsed.

In the event of error, no pulse passes through switch 191 and as a result the "and" circuit, A, shown stops the pulse from tape advance delay 187 and switch 190. No pulse is fed through switch 192 and into the second bank of "and" circuits, A, and therefore the data pulse is stopped and no escapement coils 161*a–h* are actuated.

Thus, both data coils 161*a–h* and forward escapement coil 88 are automatically isolated in the event that an error is detected by parity system 167.

Having thus described the invention, we claim:

1. A high-speed tape perforator which comprises:
(a) a tape deck;
(b) a die block;
(c) means for intermittently moving said tape over said deck and beneath said die block;
(d) a punch pin disposed transversely to said deck;
(e) means for guiding said punch pin through said deck, said tape, and into said die block;
(f) means for reciprocating said punch pin including:
(1) a pivot shaft disposed parallel to said deck,
(2) a spur gear rotatably mounted to said pivot shaft,
(3) a connector arm having one end thereof rotatably and eccentrically mounted to said spur gear and the other end thereof secured to said punch pin,
(4) a clutch shaft disposed parallel to said pivot shaft,
(5) means for rotating said clutch shaft,
(6) a clutch assembly concentrically mounted to said clutch shaft, said clutch assembly including a clutch gear engaged with said spur gear, an escapement wheel secured to said clutch gear, said escapement wheel having a number of equally spaced teeth, the number of said teeth representing the ratio of the diameter of said clutch gear to the diameter of said spur gear, an escapement armature removably engageable with said teeth to prevent rotation of said wheel and said clutch gear in the direction of rotation of said clutch shaft when engaged with said teeth, and means for connecting said escapement wheel to said clutch shaft for rotation therewith when said escapement armature is disengaged; and
(g) means for detecting said reciprocation of said punch pin.

2. The tape perforator of claim 1 and means for cooling and lubricating said means for reciprocating said punch pins.

3. The tape perforator of claim 1 and means for disengaging said escapement armature from said escapement wheel.

4. The tape perforator of claim 3 and means for coordinating said disengagement of said escapement armature from said escapement wheel with said intermittent movement of said tape.

5. The tape perforator of claim 4 and means for cooling and lubricating said means for reciprocating said punch pin.

6. A high-speed tape perforator which comprises:
(a) a tape deck;
(b) a die block;
(c) means for intermittently moving said tape over said deck and beneath said die block;
(d) a series of punch pins disposed transversely to said deck to thereby define a plane;
(e) means for guiding said pins through said deck, said tape, and into said die block;
(f) means for asynchronously reciprocating said punch pins including:
(1) a pivot shaft disposed parallel to said deck in said plane,
(2) a series of spur gears rotatably mounted to said pivot shaft,
(3) a series of connector arms having one end thereof rotatably and eccentrically mounted to each of said spur gears respectively and the other end thereof secured to each of said punch pins respectively,
(4) a clutch shaft disposed parallel to said pivot shaft,
(5) means for rotating said clutch shaft,
(6) a series of clutch assemblies concentrically mounted to said clutch shaft, each of said clutch assemblies including a clutch gear engaged with one of said spur gears, an escapement wheel secured to said clutch gear, said escapement wheel having a number of equally spaced teeth, the number of said teeth representing the ratio of the diameter of said clutch gear to the diameter of said spur gear, a series of escapement armatures removably engageable with said teeth of each of said escapement wheels respectively to prevent rotation of said escapement wheels and said clutch gear in the direction of rotation of said clutch shaft when so engaged, and means for connecting said escapement wheels to said clutch shaft for rotation therewith when said escapement armature is disengaged therefrom; and
(g) means for detecting said reciprocation of said punch pins respectively.

7. The tape perforator of claim 6 and means for asynchronously disengaging each of said escapement armatures from each of said escapement wheels.

8. The tape perforator of claim 7 and means for cooling and lubricating said means for reciprocating said pins.

9. The tape perforator of claim 7 and means for coordinating said disengagement of said escapement armature from said escapement wheels with said intermittent movement of said tape.

10. The tape perforator of claim 9 and means for cooling and lubricating said means for reciprocating said punch pins.

11. In a high-speed tape perforator having a tape deck, a die block, means for intermittently moving said tape over said deck and beneath said die block, a punch pin disposed transversely to said die block, and means for guiding said punch pin through said deck, said tape, and into said die block; perforator mechanism which comprises:
(a) a pivot shaft disposed parallel to said deck,
(b) a spur gear rotatably mounted to said pivot shaft,
(c) a connector arm having one end thereof rotatably and eccentrically mounted to said spur gear and the other end thereof secured to said punch pin,
(d) a clutch shaft disposed parallel to said pivot shaft,
(e) means for rotating said clutch shaft, and
(f) a clutch assembly concentrically mounted to said clutch shaft, said clutch assembly including a clutch gear engaged with said spur gear, an escapement wheel secured to said clutch gear, said escapement wheel having a number of equally spaced teeth, the number of said teeth representing the ratio of the diameter of said clutch gear to the diameter of said spur gear, an escapement armature removably engageable with said teeth to prevent rotation of said wheel and said clutch gear in the direction of rotation of said clutch shaft when engaged with said teeth, and means for connecting said escapement wheel to said clutch shaft for rotation therewith when said escapement armature is disengaged.

12. The perforator of claim 11 and means for cooling and lubricating said perforator mechanism.

13. In a high-speed tape perforator having a tape deck, a die block, means for intermittently moving said tape over said deck and beneath said die block, a series of punch pins disposed transversely to said deck to thereby define a plane, and means for guiding said punch pins through said deck, said tape, and into said die block; perforator mechanism which comprises:

(a) a pivot shaft disposed parallel to said deck in said plane,
(b) a series of spur gears rotatably mounted to said pivot shaft,
(c) a series of connector arms having one end thereof rotatably and eccentrically mounted to each of said spur gears respectively and the other end thereof secured to each of said punch pins respectively,
(d) a clutch shaft disposed parallel to said pivot shaft,
(e) means for rotating said clutch shaft, and
(f) a series of clutch assemblies concentrically mounted to said clutch shaft, each of said clutch assemblies including a clutch gear engaged with one of said spur gears, an escapement wheel secured to said clutch gear, said escapement wheel having a number of equally spaced teeth, the number of said teeth representing the ratio of the diameter of said clutch gear to the diameter of said spur gear, a series of escapement armatures removably engageable with said teeth of each of said escapement wheels respectively to prevent rotation of said escapement wheels and said clutch gear in the direction of rotation of said clutch shaft when so engaged, and means for connecting said escapement wheels to said clutch shaft for rotation therewith when said escapement armature is disengaged therefrom.

14. The perforator of claim 13 and means for cooling and lubricating said perforator mechanism.

15. In a tape perforator having a tape deck, a die block, means for intermittently moving said tape over said deck and beneath said die block, a series of punch pins disposed transversely to said deck, and means for reciprocally moving and guiding said punch pins through said deck, said tape, and into said die block to thereby define reciprocations; a parity system which comprises:

(a) a series of pairs of parity sensors,
  (1) said pairs including an upper sensor and a lower sensor, said upper and lower sensors being fixed at one end, and free at the other to thereby define a free end,
  (2) means for moving said free ends of said pairs with said reciprocation of said punch pins respectively to thereby define an upper and lower limit of movement of said free ends of said upper and lower sensors;
(b) a series of stationary contact assemblies,
  (1) said assemblies serving two adjacent pairs of said parity sensors and including an upper, middle, and lower contact,
  (2) said upper contact being connected to said lower contact in each of said assemblies, said upper contact being disposed above said upper sensors within said upper limit of movement of said upper sensors, said middle contacts being disposed between said upper and lower sensors within said upper limit of movement of said lower sensors and within said lower limit of movement of said upper sensors, said lower contact being disposed below said lower contacts within said lower limit of movement of said lower contacts; with
(c) the upper sensor of each of said pairs served by one of two adjacent contact assemblies connected to the lower sensor of the adjacent pair of said sensors served by said adjacent contact assembly.

16. The parity system of claim 15 wherein said series of said pairs of parity sensors includes two terminal pairs of sensors, an interrogating input lead connected with one sensor of one of said terminal pairs and two output leads connected respectively to each of said upper and said lower sensors of the other of said terminal pairs.

17. A high-speed tape perforator which comprises:

(a) a tape deck;
(b) a die block;
(c) means for intermittently moving said tape over said deck and beneath said die block;
(d) a punch pin disposed transversely to said deck;
(e) means for guiding said punch pin through said deck, said tape, and into said die block;
(f) means for reciprocating said punch pin including:
  (1) a pivot shaft disposed parallel to said deck,
  (2) a spur gear rotatably mounted to said pivot shaft,
  (3) a connector arm having one end thereof rotatably and eccentrically mounted to said spur gear and the other end thereof secured to said punch pin,
  (4) a clutch shaft disposed parallel to said pivot shaft,
  (5) means for rotating said clutch shaft,
  (6) a clutch gear concentrically mounted to said clutch shaft and engaged with said spur gear, said clutch gear having a diameter such that the ratio of said diameter to the diameter of said spur gear is a whole number greater than one,
  (7) and clutch means to release said clutch gear to thereby cause said spur gear to rotate one revolution.

18. The tape perforator of claim 17 and means for cooling and lubricating said means for reciprocating said punch pins.

19. The parity system of claim 15 in combination with a perforator mechanism which comprises:

(a) a tape deck;
(b) a die block;
(c) means for intermittently moving said tape over said deck and beneath said die block;
(d) a punch pin disposed transversely to said deck;
(e) means for guiding said punch pin through said deck, said tape, and into said die block;
(f) a series of clutch gears concentrically mounted to said clutch shaft and engaged with each of said spur gears respectively, said clutch gears having a diameter such that the ratio of said diameter to the diameter of said spur gears is a whole number greater than one, and
(g) clutch means to release said clutch gears respectively to thereby cause said spur gears to rotate one revolution.

20. The tape perforator of claim 17 wherein said means for intermittently moving said tape comprises: a capstan shaft, a forward and reverse escapement gear each having a plurality of teeth thereon, clutch means for rotating said forward escapement gear in one direction and said reverse escapement gear in the opposite direction, a forward escapement member in engagement with said escapement teeth of said forward escapement gear, a reverse escapement member in engagement with said teeth of said reverse escapement gear, said members preventing rotation of said respective escapement gears by said clutch means, said forward escapement gear concentrically fixed to said capstan shaft, a stepper gear in engagement with said reverse escapement gear, and a stepper mounted concentrically with said stepper gear and rotatably therewith in engagement with said forward escapement gear.

21. A drive mechanism for intermittently rotating a shaft in either direction which comprises: a capstan shaft, a forward and reverse escapement gear each having a plurality of teeth thereon, clutch means for rotating said forward escapement gear in one direction and said reverse escapement gear in the opposite direction, a forward escapement member in engagement with said escapement teeth of said forward escapement gear, a reverse escapement member in engagement with said teeth of said reverse escapement gear, said members preventing rotation of said respective escapement gears by said clutch means, said forward escapement gear concentrically fixed to said capstan shaft, a stepper gear in engagement with said reverse escapement gear, and a stepper mounted concentrically with said stepper gear and rotatably therewith in engagement with said forward escapement gear.

No references cited.

WILLIAM W. DYER, Jr., *Primary Examiner.*

G. A. DOST, *Assistant Examiner.*